(12) United States Patent
Cooper

(10) Patent No.: US 7,536,980 B2
(45) Date of Patent: May 26, 2009

(54) ILLUMINATED PET LEASH

(76) Inventor: Jimmy K. Cooper, 3356 Holt Cir., Pensacola, FL (US) 32526

( * ) Notice: Subject to any disclaimer, the term of this patent is extended or adjusted under 35 U.S.C. 154(b) by 0 days.

(21) Appl. No.: 12/075,495

(22) Filed: Mar. 12, 2008

(65) Prior Publication Data

US 2008/0216768 A1 Sep. 11, 2008

Related U.S. Application Data

(63) Continuation-in-part of application No. 11/178,616, filed on Jul. 11, 2005, now Pat. No. 7,367,285, which is a continuation-in-part of application No. 10/767,823, filed on Jan. 30, 2004, now abandoned.

(51) Int. Cl.
*A01K 27/00* (2006.01)
(52) U.S. Cl. ................ 119/795; 119/859; 119/792
(58) Field of Classification Search ........... 119/795, 119/859, 792, 856, 857, 863, 858, 776, 772, 119/774; 362/102, 223
See application file for complete search history.

(56) References Cited

U.S. PATENT DOCUMENTS

| 4,903,638 A | 2/1990 | Lacey |
| 5,850,807 A | 12/1998 | Keeler |
| 6,053,129 A | 4/2000 | Akre |
| 6,374,779 B1 * | 4/2002 | Miller .................. 119/863 |

FOREIGN PATENT DOCUMENTS

JP 2001-269077 10/2001

* cited by examiner

*Primary Examiner*—T. Nguyen
(74) *Attorney, Agent, or Firm*—Keaty Professional Law Corporation

(57) ABSTRACT

An illuminated pet leash has an elongated light-emitting member mounted in a transparent sleeve and extending alongside a non-extensible tethering line. An electrical power is delivered to the light-emitting member, making the tethering assembly visible in the dark. The light emitting member is secured between a stop member in the handle of the leash and an anchor fitted in a hook-shaped connector.

11 Claims, 2 Drawing Sheets

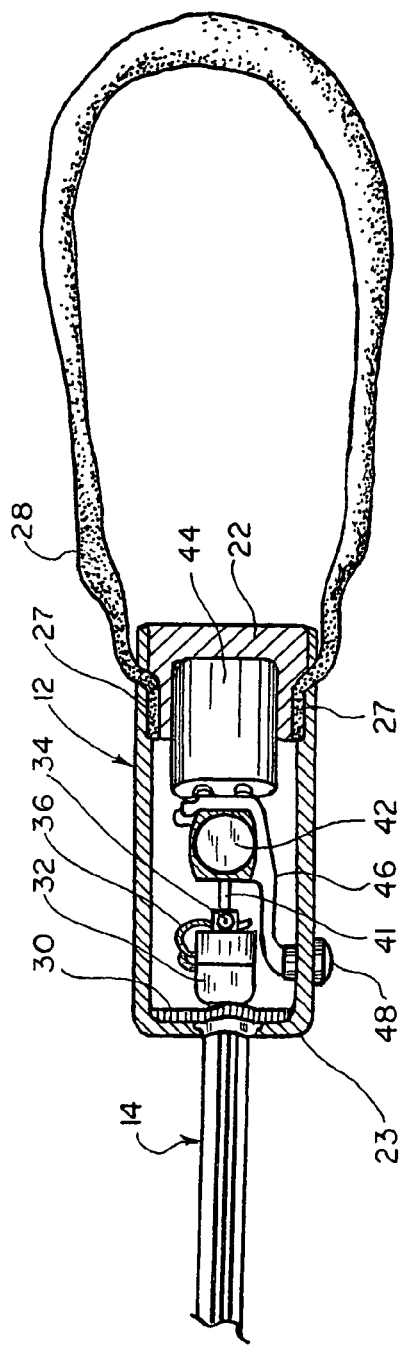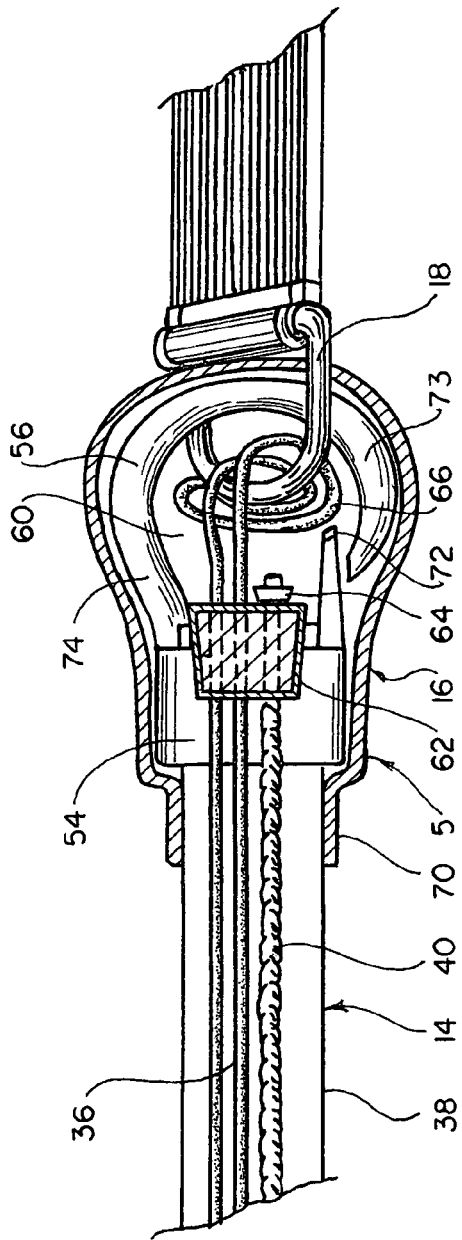

ILLUMINATED PET LEASH

CROSS REFERENCE TO RELATED APPLICATIONS

This application is a continuation-in-part of my application Ser. No. 11/178,616, filed on Jul. 11, 2005 entitled "Illuminated Pet Leash," now U.S. Pat. No. 7,367,285, which is a continuation-in-part of my application Ser. No. 10/767,823 filed on Jan. 30, 2004, entitled "illuminating Pet Leash," now abandoned, the priority of which is hereby claimed and the full disclosures of which are incorporated by reference herein.

BACKGROUND OF THE INVENTION

The present invention relates to pet leashes and, more particularly, to an illuminating pet leash having an isolated tethering line, and, still more particularly, to an illuminating pet leash comprising a flexible and strong tethering line enclosed in an elongated illuminating light source assembly, wherein the tethering line is isolated from the light source assembly.

Pet leashes or other pet tethering devices are constructed to restrain the distance a pet can move from one end of the leash or tethering device being held by the owner. Therefore, the pet leash typically includes a flexible strap, made of nylon, leather, plastic or the like, or a chain of metal links secured together. The pet leash channels the pulling and tugging forces exerted by the pet to the hand hold the pet leash.

Several devices have been patented that are aimed at illuminating pet leashes or ropes, for instance, U.S. Pat. No. 5,967,095, issued to Greves, entitled "Illuminated Pet Leash," discloses a pet leash with an elongated strap having an (electro-luminescent) EL strip secured to one side of the strap. In another embodiment, the leash has a circular (or other geometric shape) strap with the EL strip spiraling around the circular strap.

U.S. Pat. No. 5,850,807, issued to Keeler, entitled "Illuminated Pet Leash," discloses an illuminated pet leash comprising an elongated non-opaque tube having a bundle of optical fibers longitudinally disposed therein.

U.S. Design Pat. No. DES 422,385, issued to Callaghan, entitled "Illuminated Pet Collar and Leash Set," illustrates both a pet leash and collar having a band with spaced illuminating means attached thereto.

Other U.S. patents directed to illuminating articles include U.S. Pat. No. 5,071,118, issued to Barnett, entitled "Illuminated Jump Rope Apparatus"; and U.S. Pat. No. 5,879,076, issued to Cross, entitled "Method and Apparatus for Light Transmission."

Several test showed that larger dogs exert a considerable pull on the tethering line, sometimes weakening the connection of the illuminating cable with the handle and the tethering line.

In view of the foregoing, there is a continuing need for an improved illuminated pet leash that strengthens the tethering line and the elongated light source while simultaneously encasing the tethering line so as not to interrupt the illumination of the leash.

As will be seen more fully below, the present invention is substantially different in structure, methodology and approach from that of prior illuminating pet leashes.

SUMMARY OF THE INVENTION

It is, therefore, an object of the present invention to provide a pet leash that can be illuminated upon demand.

It is another object of the present invention to provide an improved pet leash, which protects the illuminating cable and prevents its break-off under the pulling force exerted by a pet.

These and other objects of the invention are achieved through a provision of an illuminated pet leash, which comprises a handle assembly comprising a hollow housing with a detachable cap. A battery is positioned in the housing for supplying power to an elongated light-emitting member through a suitable inverter. An opposite end of the light emitting member is secured to an anchor fitted in a hook-shaped connector that is adapted for connecting to a pet collar via a snap hook.

A non-extensible tethering cable and the light-emitting cable are enclosed in a transparent or translucent sleeve which extends between the handle and the connector. The tethering line transmits a pulling force exerted by a pet to the handle housing without transmitting the pulling force to the light-emitting member or the sleeve, thereby protecting the sleeve and the light-emitting cable.

BRIEF DESCRIPTION OF THE DRAWINGS

Reference will now be made to the drawings, wherein like parts are designated by like numerals, and wherein

FIG. 2 is a partial cross-sectional view of the handle.

FIG. 3 is a detail plan view of the opposite end of the leash.

DETAILED DESCRIPTION OF THE PREFERRED EMBODIMENT

Figure 1:
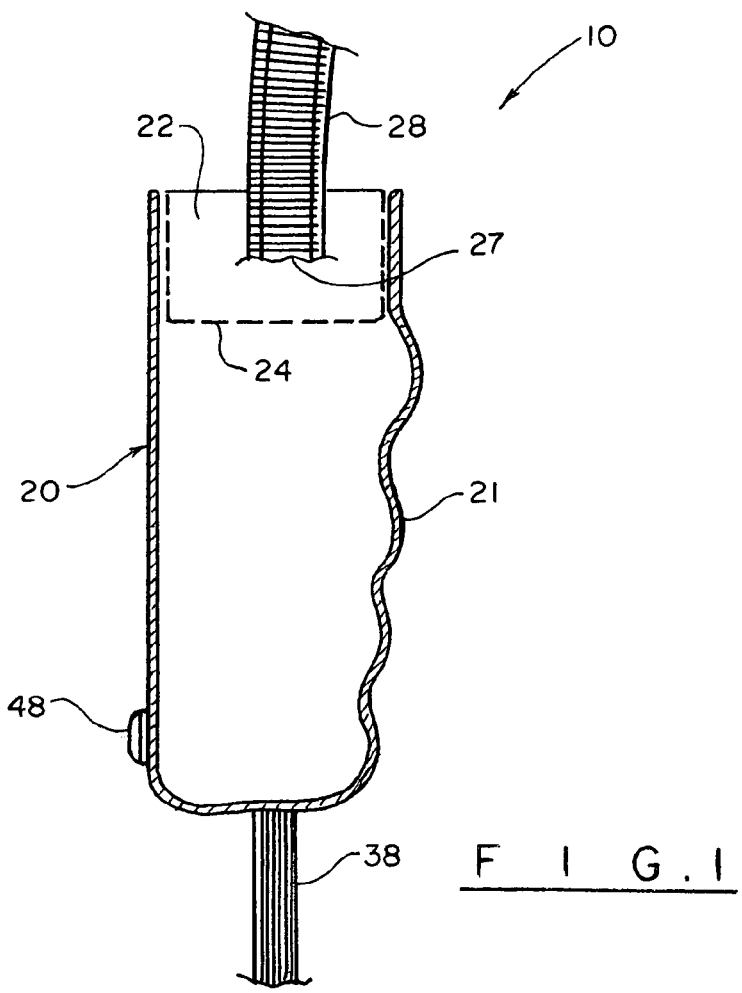
FIG. 1 is a perspective view of the pet leash handle in accordance with the present invention.
Figure 5:
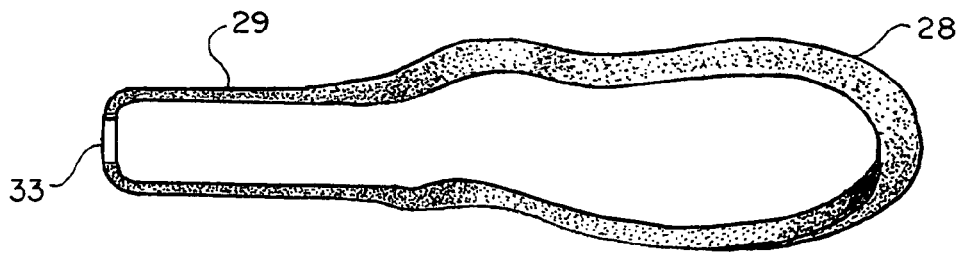
FIG. 5 is a detail view of the strap for use with the handle assembly.
Figure 4:
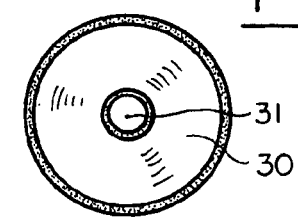
FIG. 4 is a detail view of a washer used in the handle of the leash.

Turning now to the drawings in more detail, numeral 10 designates the illuminated pet leash in accordance with the present invention. As can be seen in the drawings, the leash 10 generally comprises a handle assembly 12, an elongated tethering assembly 14 and a means 16 for securing the tethering assembly to an eyelet 18 of a snap ring (not shown) that is designed to be secured to a pet collar (not shown).

The handle assembly 12 comprises a hollow housing 20 having a grip portion 21 for comfort of a user. A cap 22 has an inner end 24, which is detachably engageable with the housing 20 when inserted into the housing 20. A pair of opposing slots 27 is formed in the housing 20 wall adjacent the cap 22. A looped strap 28 is secured to the housing 20 above the grip portion 21, threading through the slots 27. The strap 28 is forms a loop that partially extends inside the housing. The strap 28 may be slipped on the owner's wrist, if desired.

A sealing washer 30 is positioned inside the housing 20. The washer 30 is provided with a central opening 31, allowing extension of one end of the tethering assembly therethrough. A flexible, non-extensible tethering line 36 is threaded through the opening 31 and secured to a rivet of a stopper 32 mounted inside the housing 20 adjacent the washer 30. The stopper 32 may be made from non-corrosive, electrically non-conductive material, such as for instance Acetal. The rivet 34 is secured to the stopper 32 to allow the tethering line tie-off. In this manner the tethering line 36 is connected directly to the stopper 32, making the connection stronger and safer. The tethering line 36 may be made of two strands of a steel cable.

An inner portion 29 of the strap 28 extends between the washer 30 and a closed end 23 of the housing 20. The inner portion 29 is formed by extension of the strap 28, which has been folded lengthwise so as to reduce the width of the strap portion positioned in the housing 20. If desired, the folded portion may be stapled in the folded position. A suitable opening 33 is made in the center of the portion 29; the opening 33 is aligned with the opening 31 formed in the washer 30, allowing the illuminating cable 40 and the tethering line 36 to extend therethrough. The strap 28 secured in the housing 20 between the washer 30 and the housing end 23 resists pulling force exerted in the leash handle.

The tethering assembly 14 comprises a hollow flexible transparent or translucent sleeve 38, within which the tethering line 36 extends. The sleeve 38 extends inside the housing 20 and is secured to the stopper 32. An illuminating cable 40 is positioned inside the sleeve 38 and has one of its ends 41 passing through the washer opening 31, strap opening 33 and through the stopper 32.

An electrical power inverter 42 is mounted in the housing 20. The power inverter 42 can be a DC-to-AC converter, converting power of a battery 44 for illuminating the leash 10. A suitable connecting wiring establishes an electrical connection between the battery 44 and the inverter 42. An electrical wiring 46 extends from the battery 44 to an on/off switch 48, which is mounted on the housing 20. The luminous cable 40 is connected to the inverter 42 by suitable wiring, which establishes an electrical connection between the power source, or battery 44 with the cable 40. The cable 40 is capable of being illuminated when an electrical circuit is completed by pushing the "on" switch 48. The sleeve 38 being a transparent or translucent, allows the light from the cable 40 to be visible through the wall of the sleeve 38, thus providing an aesthetic and safety feature to the leash 10. The sleeve 38 is dimensioned such that the cable 40 "floats" inside the sleeve 38 without any pulling force being applied to the luminescent cable 40.

As shown in FIG. 3, the securing means comprise a securing member 52 having a cylindrical portion 54 and hook-shaped portion 56. A tongue 58 extends from the cylindrical portion 54 towards the hook-shaped portion 56, enclosing an area 60. A hollow anchor 62 is fitted into a central opening formed in the cylindrical portion 54. The anchor has a central opening, through which the illuminating cable 40 and the tethering line 36 extend. The cable 40 is crimped at 64 upon exiting the anchor 62, thereby preventing curling of the cable 40.

The cable 40 and the tethering line 36 are pressed into the cylindrical portion 54, to which the free end of the sleeve 38 is secured. When a pulling force is applied to the tethering line 36, the pulling force is transmitted to the sleeve 38. In previous design, if the user happens to hold the sleeve 38 at that moment the sleeve 38 had a tendency to slip loose and ride up the line 36 and the cable 40. To solve the problem, the instant invention provides for a cover 70 that encloses the securing means 16 and a portion of the sleeve 38 with the cable 40 and the tethering line 36 extending therein. The anchor is pressed against the cylindrical portion 54 and the cover 70, transmitting the pulling force to the hook-shaped portion 56. With this design, the problem of the sleeve 38 riding up has been solved. An additional benefit of the cover 70 is that it encloses the snap connections and protects the pet's hair when the tethering line is twisted.

A free end 66 of the tethering line 36 is looped over and forms a hook-shaped end portion extending into the area 60. The hook-shaped portion 66 is hooked over the eyelet 18, with at least a part of the eyelet 18 being enclosed in the cover 70. The cover 70 fits tightly around the securing means 16, conforming to the shape of the securing means 16.

Figure 6:
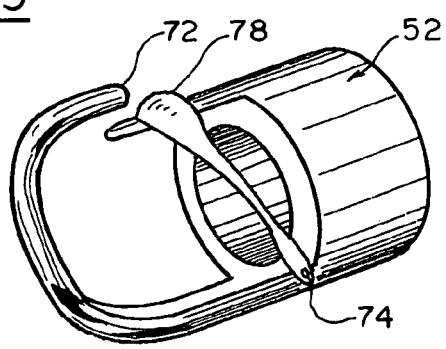
FIG. 6 is detail view illustrating a securing member for attachment to a pet collar.

A pilot opening 72 is made in a free end 73 of the hook 56. A second pilot opening 74 is formed in the hook 56 closer to the cylindrical portion 54. A small tie wire 78 (FIG. 6) is threaded through the pilot holes 72, 74 prior to positioning the cover 70 over the securing end 16, thereby preventing stretching of the hook 56 and strengthening the securing end 16.

The tethering line 36 has a discreet length, which is greater than the length of either the sleeve 38 or the cable 40; it prevents excessive stretching of the cable 40 and the sleeve 38 when a pet tugs or pulls on the leash 10. The tethering line 36 is independently connected to the leash 18 through the anchor 62 and the stopper 32. As described above, the first end of the tethering line 36 is rigidly connected to the handle assembly 12. In one of the exemplary embodiments, the tethering line 36 has tensile strength of about 90 pounds, doubled in strength due to the looping of the line 36 over the ring 18 and extending as a double line inside the sleeve 38. A pet tugging on the leash 10 does not break the sleeve 38 and the luminous cable 40 extending therethrough.

In operation, the owner secures the leash 10 to the eyelet 18 by using a snap hook and grabs the handle assembly 12. If desired, the owner may slip the strap 28 over a wrist. As the pet moves, the tethering assembly can be extended to its full length but will not extend more than the length of the tethering line 36 looped between the eyelet 18 and the rivet 34. When illumination is desired, the owner may press the "on" switch 48 and cause the power to be delivered through the cable 40. When the walk is over, the owner presses on the switch 48 again and the electrical connection is interrupted. The battery 44 may be a 9-volt battery and may be rechargeable.

If desired, the handle housing 20 can be made from soft vinyl in a variety of colors. The leash can be up to 7 feet, with the illuminated part being about 6 feet. The light is distributed 360 degrees from the handle down to the snap hook. A person walking the animal at night enjoys greater safety, as the leash 10 is visible to cars. The length can be customized to make the leash longer than 6 to 7. If the inverter 42 has greater power, the leash 10 can be made significantly longer, up to 25 feet.

It is envisioned that the sleeve 38 may be wrapped around the pet's collar and make the collar portion visible as well. The sleeve 38, being made from a flexible material, with the tethering line 36 and the cable 40 being flexible as well, can be incorporated into a retractable-type pet leash. All materials used in the making of components of the leash 10 are preferably made from lightweight, non-corrosive materials. The battery and the electrical circuit is enclosed within the handle assembly 12 and is not exposed to the environment. The battery can be easily changed by disengaging the cap 22 from the housing 20.

Many changes and modifications can be made in the design of the present invention without departing therefrom. I therefore pray that my rights to the present invention be limited only by the scope of the appended claims.

I claim:

1. An illuminated pet leash, comprising:
    a handle assembly comprising a housing with an electrical circuit positioned therein;
    a stopper member fitted in the housing;
    a connector assembly configured for securing to a pet collar via a snap hook with an eyelet, said connector assembly comprising an anchor member for securing a free end of the light emitting member, a connector member having a cylindrical portion and a hook-shaped portion, and wherein said hook-shaped portion is configured to engage the eyelet of the snap hook, and wherein said connector assembly further comprises a flexible, form-fitting cover enclosing said connector assembly at least a part of said eyelet; and an elongated tethering assembly extending between the handle housing and the connector assembly, said tethering assembly comprising a light-emitting member operationally connected to said electrical circuit and a flexible non-extensible tethering line secured to said stopper member and extending between the housing and the connector assembly, said tethering line transmitting a pulling force exerted by a pet to the handle housing without transmitting the pulling force to the light-emitting member.

2. The apparatus of claim 1, wherein said tethering line extends through said anchor member and is configured to engage the eyelet of the snap hook.

3. The apparatus of claim 1, wherein said hook-shaped portion is provided with a first opening formed in a free end thereof and a second opening a distance from said first opening, and wherein a securing tie is threaded through said first opening and said second opening to resist pulling force tending to unbend the hook-shaped portion.

4. An illuminated pet leash, comprising:
a handle assembly comprising a housing with an electrical circuit positioned therein, said electric circuit comprising an independent power source and an inverter coupled to the power source and the light-emitting member;
a stopper member fitted in the housing, wherein said light-emitting member extends through said stopper and is electrically connected to said inverter;
a connector assembly configured for securing to a pet collar via a snap hook with an eyelet; and
an elongated tethering assembly extending between the handle housing and the connector assembly, said tethering assembly comprising a light-emitting member operationally connected to said electrical circuit and a flexible non-extensible tethering line secured to said stopper member and extending between the housing and the connector assembly, said tethering line transmitting a pulling force exerted by a pet to the handle housing without transmitting the pulling force to the light-emitting member.

5. An illuminated pet leash, comprising:
a handle assembly comprising a hollow housing with a detachable cap and with an electrical circuit positioned in the housing, said electric circuit comprising an independent power source, an inverter and an on/off switch;
a connector assembly configured for detachable securing to a pet collar via a snap hook with an eyelet, said connector assembly comprising an anchor member and a connector member having a cylindrical portion and a hook-shaped portion, and wherein said hook-shaped portion is configured to engage the eyelet of the snap hook, said connector assembly further comprising a flexible, form-fitting cover enclosing said connector assembly at least a part of said eyelet;
an elongated tethering assembly extending between the handle housing and the connector assembly, said tethering assembly comprising a light-emitting member operationally connected to said electrical circuit and a flexible non-extensible tethering line extending between a stopper member positioned in the housing and the connector assembly, said tethering line transmitting a pulling force exerted by a pet to the handle housing without transmitting the pulling force to the light-emitting member; and an elongated light-permeable sleeve secured between the handle housing and the connector assembly, said sleeve enclosing said light-emitting member and at least a part of said tethering line.

6. The apparatus of claim 5, wherein said tethering line has a discreet length at least slightly greater than the length of the elongated sleeve and the light-emitting member.

7. The apparatus of claim 5, wherein said hook-shaped portion is provided with a first opening formed in a free end thereof and a second opening a distance from said first opening, and wherein a securing tie is threaded through said first opening and said second opening to resist pulling force tending to unbend the hook-shaped portion.

8. The apparatus of claim 5, wherein said handle housing is provided with a washer positioned in an end of the housing opposite said cap, and a flexible loop strap secured to the housing.

9. The apparatus of claim 8, wherein the handle housing is provided with a pair of opposing slots formed in a wall of the housing, and wherein at least a part of the strap extends through said slots into the housing.

10. The apparatus of claim 5, wherein at least a part of said strap is fitted between said washer and said stopper.

11. An illuminated pet leash, comprising:
a handle assembly comprising a hollow housing with a detachable cap and with an electrical circuit positioned in the housing, said electric circuit comprising an independent power source, an inverter and an on/off switch;
a connector assembly configured for detachable securing to a pet collar via a snap hook with an eyelet, said connector assembly comprising an anchor member and a connector member having a cylindrical portion and a hook-shaped portion;
an elongated tethering assembly extending between the handle housing and the connector assembly, said tethering assembly comprising a light-emitting member operationally connected to said electrical circuit and a flexible non-extensible tethering line extending between a stopper member positioned in the housing and the connector assembly, said tethering line transmitting a pulling force exerted by a pet to the handle housing without transmitting the pulling force to the light-emitting member, said tethering line extending through said anchor member and being configured to engage the eyelet of the snap hook; and
an elongated light-permeable sleeve secured between the handle housing and the connector assembly, said sleeve enclosing said light-emitting member and at least a part of said tethering line.

* * * * *